(No Model.) 2 Sheets—Sheet 1.
J. H. & S. W. HUMPHREY.
HAY GATHERER.
No. 361,877. Patented Apr. 26, 1887.
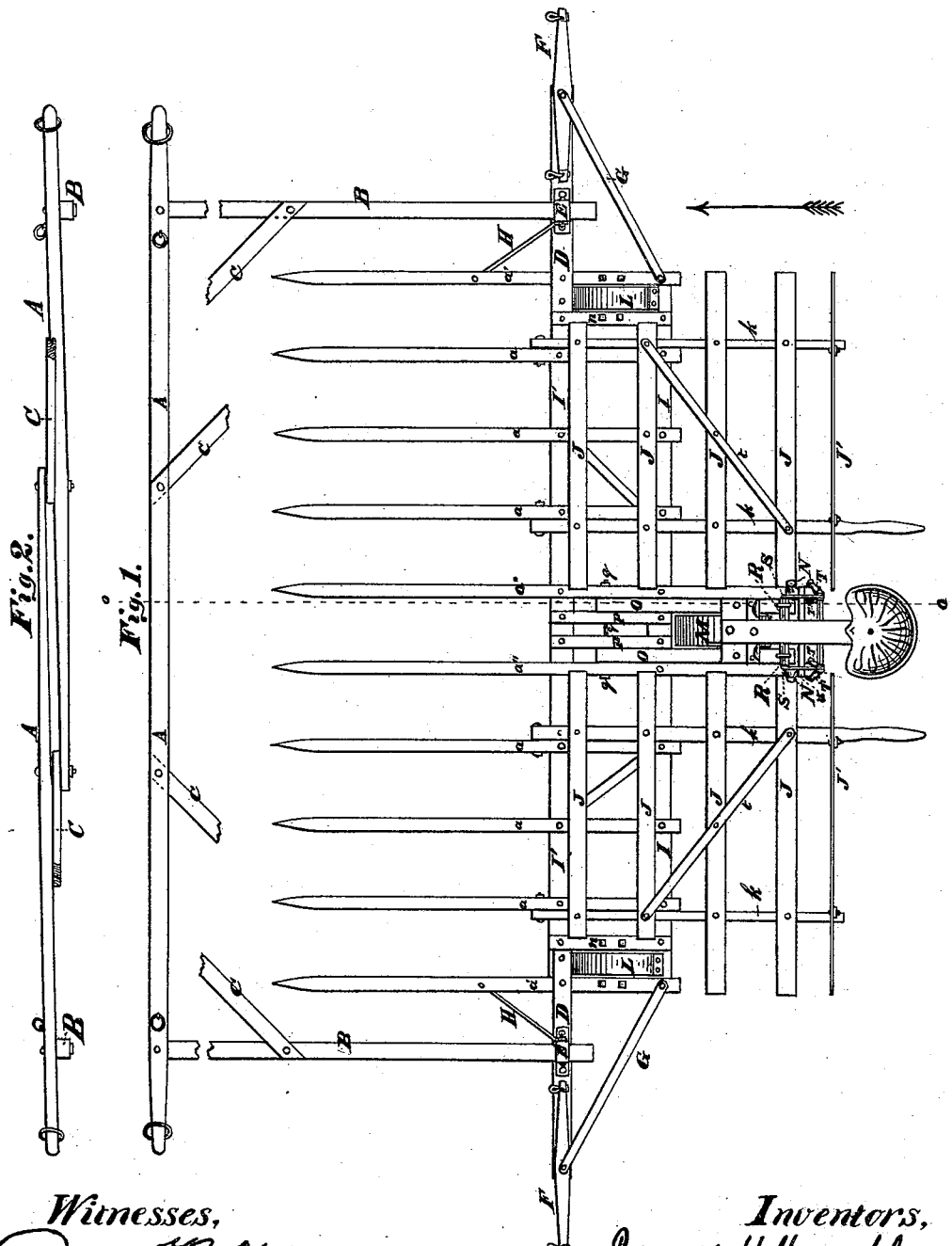
Witnesses,
Inventors,
James H. Humphrey
Simeon W. Humphrey

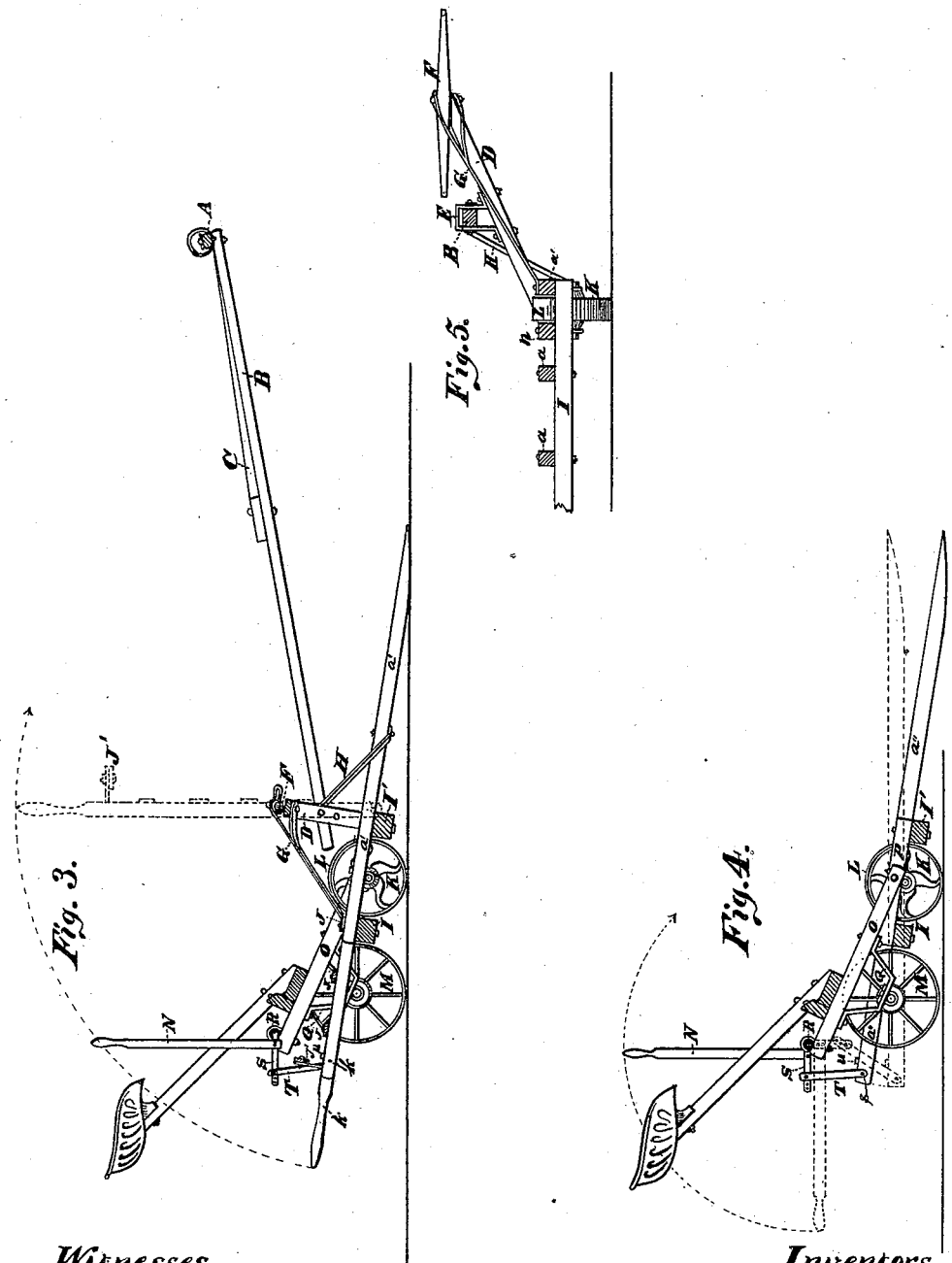

UNITED STATES PATENT OFFICE.

JAMES H. HUMPHREY AND SIMEON W. HUMPHREY, OF PLATTE CITY, MO.

HAY-GATHERER.

SPECIFICATION forming part of Letters Patent No. 361,877, dated April 26, 1887.

Application filed January 10, 1887. Serial No. 223,989. (No model.)

*To all whom it may concern:*

Be it known that we, JAMES H. HUMPHREY and SIMEON W. HUMPHREY, citizens of the United States, residing in Platte City, in the county of Platte and State of Missouri, have invented a new and useful Improvement in Hay-Gatherers, of which the following is a full, clear, and exact specification.

The object of our invention is to provide a machine to facilitate the rapid and economical gathering of hay.

In the drawings, Figure 1 is a top or plan view of our improvement in hay-gatherers, showing its general construction. The teeth $a'$ $a'$ $a''$ $a''$ $a$ $a$ $a$ $a$ $a$ $a$ form the rake for gathering the hay. The right and left reliefs (which are composed of the slats J J' and $k$ $k$) serve as tables for the hay to accumulate on. The latter are also used to assist in piling the hay upon the machine by being raised to a perpendicular position, (see dotted lines, Fig. 3,) thereby turning the hay over upon itself, and also in unloading, when backing out, by raising said reliefs just high enough to let the hay slide off. The seat is supported on a beam by the pivot-wheel M, which turns on a mandrel that is fastened to brackets on the under side of the beams O, being pivoted to the teeth $a''$ $a''$ and pieces P P. The levers N (more clearly shown in Figs. 3 and 4) serve to regulate the teeth for gathering hay, carrying a load, or traveling on the road. Fig. 2 is a front view of the backing-pole A A, showing manner of construction. Fig. 3 is a side elevation of the machine, showing the relative position of the different parts. Fig. 4 is a vertical sectional view of the hay-gatherer on the dotted line $o$ $o$, Fig. 1, showing the operation of the lever N and the position of the pivot-wheel, seat, &c. Fig. 5 is a rear view of the right-hand side of the machine, which shows the position of the draw-bars, whiffletrees, stirrups, &c., looking in the direction of the arrow in Fig. 1.

Similar letters in the different figures indicate the same parts in the same or different positions.

The backing-pole A is connected to the shafts B and stiffened by the diagonal braces C, as shown in Figs. 1, 2, and 3. The shafts B and braces C are broken away in Fig. 1 to allow room for front view of backing-pole, Fig. 2.

The backing-pole consists of two pieces, A A, that lap over each other about one-half their length, and are firmly fastened together at the junction of the diagonal braces C, (see Figs. 1 and 2,) the whole making a combined rectangular hitching-frame and backing-pole. (See Fig. 1.) This hitching-frame and backing-pole is pivoted to the draw-bars D D, Figs. 1, 3, and 5, by means of the stirrups E E, Figs. 1 and 5, which allow a perpendicular, but no lateral or horizontal, motion.

The draw-bars D D are fastened to the beam I' and over the teeth $a'$ $a'$ (at right angles to the shafts B B) in a rigid manner, as shown in Fig. 1. The outer ends of the draw-bars D D are elevated at an angle to the machine, (see Fig. 5,) and provided with whiffletrees F F, as shown in Figs. 1, 3, and 5.

The draw-bar is stiffened by a forked brace, G G, one fork of which extends under the outer end of draw-bar, the other fork passing over the whiffletree, thus forming a clevis that binds the draw-bar and whiffletree together, the opposite end of the brace being fastened to the rear end of the teeth $a'$ $a'$. (See Figs. 1 and 3.) The braces H H also serve as a support for the draw-bar, and at the same time divide the hay at the side of the machine. They are fastened to the side of the stirrups E E and on the under side of the teeth $a'$ $a'$. (See Figs. 1 and 3.)

The main beams I I' are long straight pieces of wood extending across the machine from side to side, on which the machine is built, (see Figs. 1, 3, 4, and 5,) the teeth $a'$ $a'$ $a''$ $a''$ $a$ $a$ $a$ $a$ $a$ being fastened on their upper side in such a manner that they form a rake. (See Fig. 1.)

Extending back from the beam I' on both sides of the center of the machine are platforms or supports for the hay to accumulate on, which we term the "right and left relief." They consist of the bars $k$ $k$, which are pivoted to the teeth just in front of the beam I', and the cross-slats J J', and a diagonal brace, $t$. (See Figs. 1 and 3.) By raising the reliefs, as shown by the dotted lines in Fig. 3, the hay is piled up on the machine. The reliefs also aid in unloading when backing out by being lifted just high enough to allow the hay to slide off. At the back of each relief the slat J', Figs. 1 and 3, stands perpendicular to the surface of the relief and sufficiently high to prevent the hay from sliding over the back.

The hay-gatherer as now described balances on the wheels K K, Figs. 1, 3, and 4, which are situated between and near the ends of the beams I I', and revolve on a mandrel, which is fastened to the under side of the teeth $a'$ $a'$ and the short pieces $n$ $n$, Figs. 1 and 5, the hay being prevented from getting entangled in them by shields or coverings L.

The pivot-wheel M is so named because it forms the pivot around which the teeth $a'$ $a'$ $a''$ $a''$ $a$ $a$ $a$ $a$ $a$ $a$ and the wheels K K describe a circle when turning empty, and it supports the whole weight of the driver and a large part of the weight of the hay-gatherer.

The beams O, Figs. 1 and 4, are pivoted to the teeth $a''$ $a''$ and the short pieces P at $q$, as shown in Fig. 1. The under sides of the beams O are lagged up with wooden or metal brackets Q, Figs. 3 and 4, to which the mandrel on which the wheel M revolves is fastened. On the upper side of said beams the bar that supports the seat is fastened in a substantial manner, as shown in Figs. 1, 3, and 4. By this arrangement it will be seen that the weight of the driver is not only taken off the hay-gatherer proper, but acts as a counterpoise-weight on the fulcrum formed by the pivot-wheel M and the pivots $q$, (see Fig. 1,) and thus supports the center of the hay-gatherer.

At or near the ends of the beams O O is a tube, R, that extends across from one to the other, and which is made fast to said beams. Through this tube R the bar S, that forms a part of the compound lever, passes, said bar being bent at right angles and extending backward on both sides, where it emerges from the tube R, as shown in Figs. 1, 3, and 4.

The rods T T, Figs. 1, 3, and 4, connect the bar S with the ends of the teeth $a''$ $a''$, thus forming a series of levers, by which the points of the teeth $a'$ $a'$ $a''$ $a''$ $a$ $a$ $a$ $a$ $a$ $a$ are raised and lowered at the will of the driver by the levers N N. The views in Figs. 1, 3, and 4 show the position of the teeth and the lever N when the machine is gathering hay. The dotted lines in Fig. 4 indicate the position of the teeth, the lever N, the bar S, and the rods T when the machine is loaded or carrying a load in the field or road. It will be noticed that the pivots that connect the bar S with the rods T pass forward or in front of a direct line from the tube R to the pivot $s$, the rods T striking a stop-bar, $u$, Figs. 1, 3, and 4, that is fastened to the rear end of the teeth $a''$ $a''$, thus stopping the action of the lever and forming a self-lock that holds the teeth in a horizontal position.

What we claim as our invention, and wish to secure by Letters Patent, is—

1. The rectangular backing-pole and hitching-frame consisting of the two bars A A, lapped in the middle, the side bars, B B, and the oblique braces C C, connected to the side bars, B, and secured at their other ends between the lapped ends of the bars A A, in combination with the draft-bar D, the whiffletrees F, and the hay-gatherer, substantially as shown and described.

2. A hay-gatherer consisting of teeth $a'$ $a'$ $a''$ $a''$ $a$ $a$ $a$ $a$ $a$ $a$, the beams I I', and the right and left hinged or pivoted reliefs consisting of the beams $k$ $k$ and slats J J', combined with and balanced on the wheels K K, substantially as shown and described.

3. The combination of the rake having two middle teeth, $a''$ $a''$, extended back to the rear of the machine, the bars O, hinged at their forwards ends between said teeth and carrying a seat, the pivot-wheel M, arranged upon the under side of bars O, the lever N, a rock-shaft connected thereto arranged at the rear ends of bars O, and provided with arms S, and the pitman T, connecting the arms S, with the rear ends of the rearwardly-extending teeth $a''$ $a''$, substantially as shown and described.

JAMES H. HUMPHREY.
SIMEON W. HUMPHREY.

Witnesses:
GEO. A. SPOONER,
JOHN H. KETCHESON.